Aug. 30, 1949.  L. G. HENDRICKSON  2,480,732
FILTER APPARATUS FOR PURIFYING FLUIDS
Filed March 3, 1944  3 Sheets-Sheet 1

Inventor
Luther G. Hendrickson
By Smart Biggar
Attys

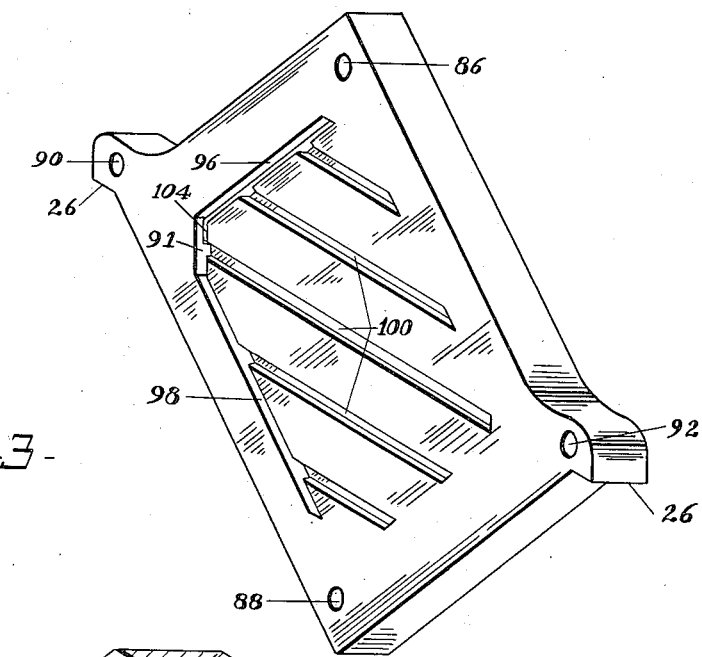
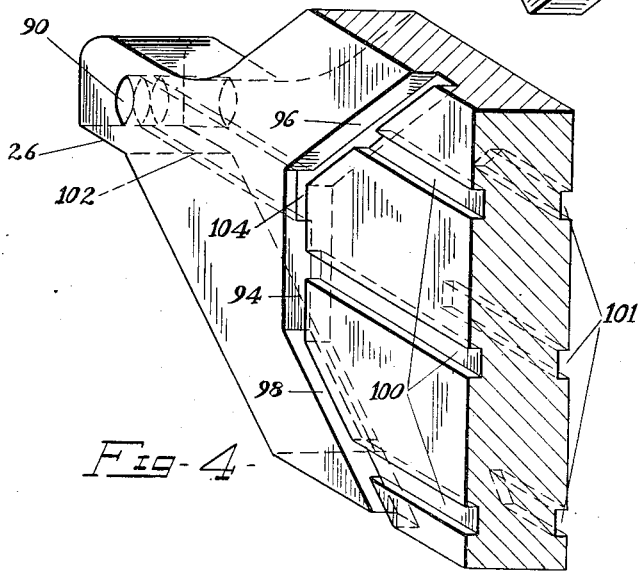

Aug. 30, 1949.  L. G. HENDRICKSON  2,480,732
FILTER APPARATUS FOR PURIFYING FLUIDS
Filed March 3, 1944  3 Sheets-Sheet 3
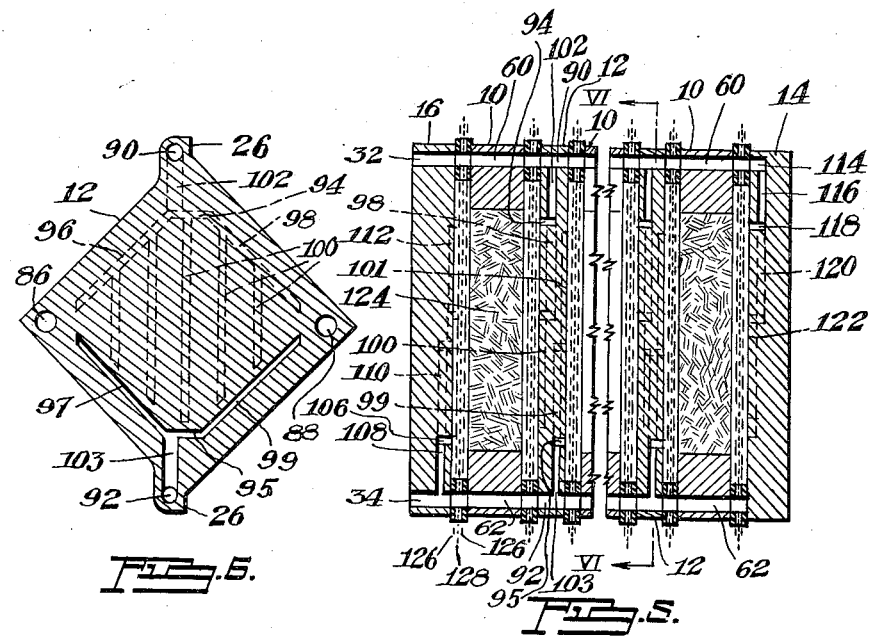
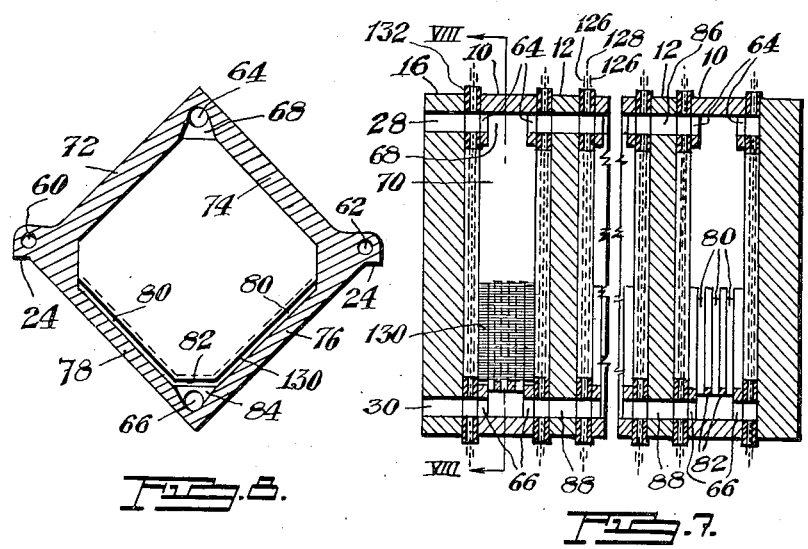
Inventor
Luther G. Hendrickson
BY
Attys.

Patented Aug. 30, 1949

2,480,732

UNITED STATES PATENT OFFICE 2,480,732

FILTER APPARATUS FOR PURIFYING FLUIDS

Luther Glenn Hendrickson, Flin Flon, Manitoba, Canada, assignor to Hudson Bay Mining and Smelting Co., Limited, Winnipeg, Manitoba, Canada, a corporation of Canada Application March 3, 1944, Serial No. 524,960

3 Claims. (Cl. 23—252)

This invention relates to a method whereby intimate contact of a fluid with a solid in a fine state of sub-division is obtained while maintaining the particles of solid in a compact mass, and whereby extraneous solids suspended in the fluid can be prevented from becoming associated with the first mentioned solids while carrying out the operation as discussed above; and to an apparatus whereby the above mentioned operations can be carried out satisfactorily; and to an apparatus as mentioned above into which can be introduced the solid in a finely divided state so as to completely fill confined spaces in said apparatus.

In certain cases, it is required to treat solutions with a reagent in the form of small solid particles with a view to removing small amounts of dissolved materials from the solution. An example of this is the removal of dissolved metal impurities from zinc sulphate solutions by precipitation on zinc dust. This is ordinarily accomplished by agitating the solution with zinc dust. If agitation is violent, the precipitated metals become dissociated from the precipitating metals. A more satisfactory purification can be accomplished by maintaining the particles of solids in a compact mass while treating the liquid.

This invention is a method of, and an apparatus for, obtaining contact of a fluid with a solid in a finely divided state so that the solid remains in a compact mass.

It is apparent that if any material is precipitated from the liquid by the solid, the precipitated material will also be maintained in a compact body with the particles of solids. In the case of purification of zinc sulphate solutions by agitation with zinc dust, this condition is roughly achieved by agitating very slowly. However, since the contact is not intimate enough, the rate at which the precipitating reaction proceeds is so slow that a long time is required to achieve the desired result.

A further object of this invention then, is to provide for intimate contact of the fluid with the finely divided solid while maintaining the particles of solid in a compact body by providing for the positive passage of the fluid through the particles of solid filling a space confined, at least partially, by a medium permeable to a fluid.

Zinc sulphate solutions often contain small amounts of suspended solids of a gelatinous nature. If such solutions were passed through (say) a confined mass of zinc dust, the suspended gelatinous solids would coat the zinc dust particles, thereby rendering them inactive.

Another object of this invention is to prevent extraneous solids suspended in the fluid from becoming associated with the particles of solid by confining the particles of solid with a medium permeable to a fluid, but which is impermeable to both the particles of solid in the compact body and to the extraneous solids. These extraneous solids, often found in suspension in zinc sulphate solution, would collect on the retaining medium and render it relatively impervious to the solution.

For this reason, an additional object of the invention is to provide for the revseral of the direction of flow of the fluid through the compact mass of solid particles and the retaining media so that the extraneous solids which might blind the confining media will be carried away from the confining media by the fluid.

An additional object of this invention is to provide for the mechanical introduction of the finely divided reagent into the space confined by the porous media and the walls of the apparatus by passing the reagent in as a slurry of solid particles suspended in water.

To more clearly illustrate the invention, I will describe the same by reference to the passage of zinc sulphate solutions through zinc dust, referring to the accompanying drawings showing one form of apparatus embodying the invention and adapted to carry the novel process into effect. Although this method and apparatus as described is ideally suited to the treatment of zinc electrolytes with zinc dust, numerous other applications of the invention will be apparent to those skilled in the arts.

Briefly described, the apparatus comprises an assembly of alternately positioned plates and frames, with a filter interposed between each side of each frame and the adjacent plates. The frames and plates have four aligned bores, a first pair serving for supplying a slurry of solid reagent into the spaces within the frames and for removing the liquid from the slurry once the reagent is deposited within the frames. The lower portions of the inner surfaces of the frames are provided with grooves covered with screens, the grooves assisting in the draining of liquid from the slurry, and the screens serving to maintain the solids within the frames.

The plates have grooves on each of their faces, and these grooves are connected to the second pair of bores. The sets of grooves on the opposite faces of each plate are connected one to each of the second pair of bores. There is no direct communication between the first set of bores and the grooves on the plates, nor between the second set of bores and the spaces within the frames.

In operation, the first set of bores is used for passing a slurry of solid reagent into the spaces within the frames and for draining away the liquid of the slurry to leave a deposit of solid reagent within the frames. The liquid to be treated is then passed into one of the second pair of bores, whence it passes through the grooves on the plate faces lying on one side of the plates, through a filter where solids in the liquids are kept from contact with the solid reagent, then through the solid reagent, and through the filter on the other side of each frame into the grooves on the other set of plate faces. From these grooves the liquid which has been treated passes to the other bore of the second pair of bores and is then removed from the apparatus.

The connections to the second pair of bores are reversible so that each one can be used either for feeding liquid to the apparatus or for drain, and the reversal of flow so provided is used in cleaning from the filters any solids which are deposited thereon by the treating liquid as it is passed into the beds of solid reagent.

Having thus set forth objects of the invention, reference will now be had to the drawings wherein:

Figure 3 is a parallel perspective view of a plate 12.

Figure 4 is an enlarged parallel perspective view of the corner of a plate 12 carrying the hole 90 of Figure 3, showing hidden details as dotted lines.

Figure 5 is a sectional view of Figure 1 taken horizontally through solution channels 32 and 34.

Figure 6 is a sectional view of a plate taken vertically through the solution channel 103 at VI—VI in Figure 5.

Figure 7 is a sectional view of Figure 1 taken vertically through the filling channels 28 and 30.

Figure 8 is a sectional view of a frame taken vertically so as to bisect it as at VIII—VIII in Figure 7.

Throughout the various views, like parts are designated by like numerals.

Figure 1:
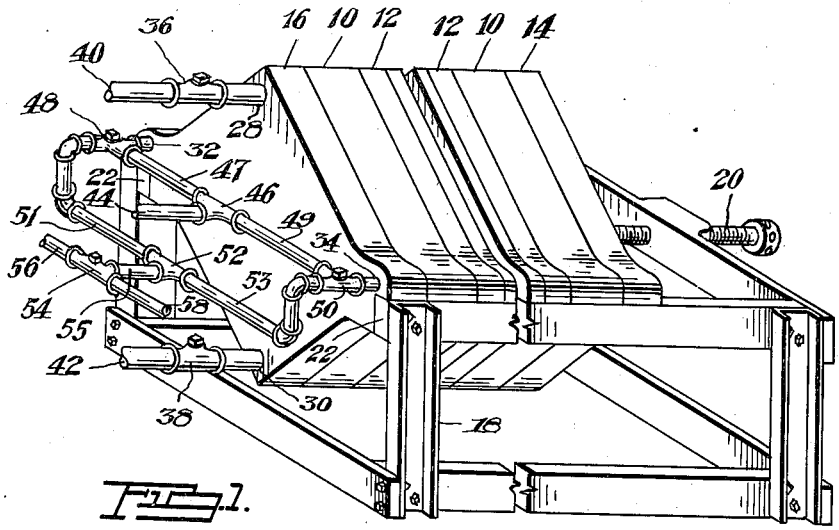
Figure 1 is a parallel perspective view of the apparatus embodying the invention.
Figure 2:
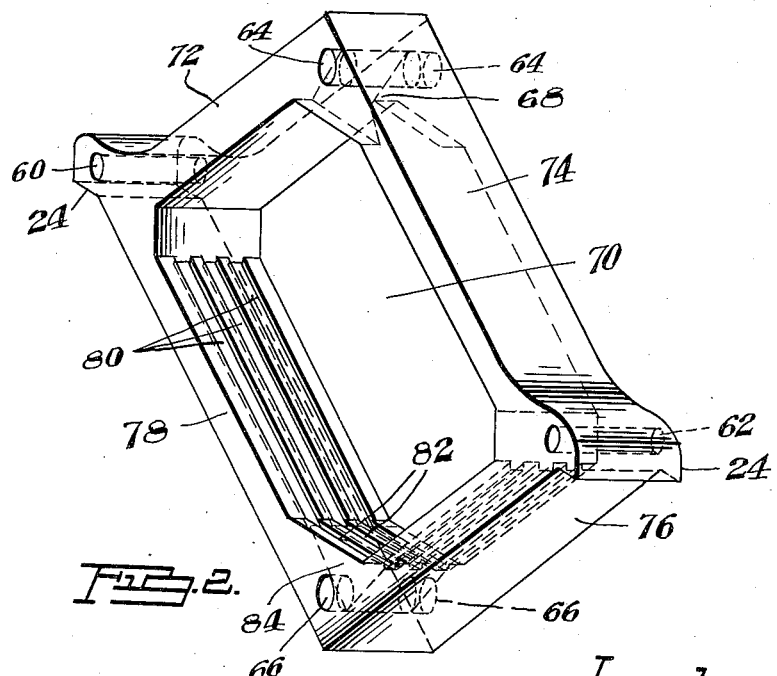
Figure 2 is a parallel perspective view of a frame 10 showing hidden details as dotted lines.

Referring to Figure 1, the numeral 18 refers to a rigid supporting structure carrying two horizontal and parallel beams 22. The head plate 16 is bolted securely to this structure at one end. The frames 10 and plates 12 and the butt plate 14 rest in the bed formed by the supported beams 22 being supported by the lugs 24 and 26 respectively. The bed also carries a suitable closing mechanism 20 shown in the form of a screw extending through the supporting structure by which the plates and frames can be clamped tightly against the head plate 16.

The head plate 16 carries a piping arrangement which facilitates the operation of the apparatus. The essential features are a pipe 40, carrying a valve 36, for example a plug valve, leading to a hole 28 in the top corner of the head plate 16. In the diametrically opposite corner of head plate 16 is a similar pipe 42 and valve 38 leading to the hole 30. At each of the other two corners of the head plate 16 are the holes 32 and 34, into which are threaded pipes carrying the two-way valves 48 and 50 respectively, which may be of the plug valve type. One outlet of the two-way valve 48 is connected to the T 46 by the pipe 47 and the other outlet of valve 48 is connected to the T 52 by the elbow and pipe arrangement 51. Similarly, one outlet of valve 50 is connected to the T 46 by the pipe 49 and the other outlet of valve 50 is connected to the T 52 by the elbow and pipe arrangement 53. The inlet pipe 44 is threaded into the remaining inlet to T 46. Into the remaining inlet to T 52 is threaded pipe 55 which carries the two-way valve 54. The outlet pipes 56 and 58 are threaded into the valve 54 and lead to separate storage tanks.

Figures 2, 5, 7 and 8 show various features of a frame 10. In order to facilitate complete filling of the chamber 70 in the frame with cake, it is convenient that the confining sides 72 and 74 be inclined, for example as shown in the drawings. The shape of the bottom part of the frame as confined by sides 78 and 76 in Figure 2 can be varied. For example, it might be made rectangular to carry a larger quantity of reagent. The holes 64 in the top corner of the frame 10 open into a large channel 68 leading to the main frame chamber 70. The inside faces of the lower confining sides are provided with grooves which are covered with a porous medium for retaining the reagent. For example, the sides 78 and 76 carry longitudinal grooves 80 which lead to the channel 84. Across the top of the channel 84 and coinciding with the lands between the grooves 80, are bars 82 which form a grid. Covering these grooves and grid is a medium which is permeable to liquids but which would retain the solid reagent particles. For example, a screen 130 of suitable mesh size may be welded to the inside faces of 78 and 76 so as to be supported above the grooves 80 and by grid bars 82, (see Figure 8). The holes 66 open into the channel 84. Holes 60 and 62 at the other two corners of frame 10, extend through and are not connected directly to the frame chamber 70 but form parts of the impure and purified solution conduits.

In an optional construction of frames 10, the channels 84 lead to individually valved exit ports in each frame, and holes 66 are dispensed with. In this optional arrangement the fluid escapes from each frame separately in place of via holes 66, 88, 30 and valve 38, and all the latter are omitted from the construction.

Figures 3, 4, 5, 6 and 7 show various features of a plate 12. The shape of the plates conforms to the shape of the frames. Holes 86 and 88 at the top and bottom of the plate respectively are placed to correspond to holes 64 and 66 respectively and to form parts of the inlet and outlet conduits for the materials connected with the introduction of the reagent into the frame. Grooves are cut in both faces of the plates so as to ensure even distribution of the solution over the face of the plate prior to passage through the reagent. For example 94, 96 and 98 refer to the main grooves on one face and 95, 97 and 99 are the corresponding grooves on the opposite face. Subsidiary grooves 100 on one face and 101 on the other face complete suitable groove arrangements. The holes 90 and 92 extend through the plates and form parts of the impure and purified solution conduits. The groove 94 is connected with the hole 90 by means of the channel 102. It is preferable that channel 102 be beneath the surface of the plate so as to prevent escape of the reagent through to the hole 90. On the other face, channel 103 corresponds to channel 102 and joins hole 92 and groove 95. It will be noticed that the faces of a plate are identical but diametrically opposite about a central vertical axis.

The head plate 16 carries grooves 106, 110 and 112 as in Figure 5 and the inner face is the same as one side of a plate 12. The groove 106 is connected with the hole 34 by the channel 108 which is analogous to channel 103 in plate 12. The holes 32 and 34 in head plate 16 are placed in positions corresponding to holes 60 and 62 in frames 10 and to holes 90 and 92 in plate 12 respectively. Also the holes 28 and 30 in head plate 16 are placed in positions corresponding to holes 64 and 66 in frames 10 and to holes 86 and 88 in plates 12.

Butt plate 14 carries grooves 118, 120 and 122 as in Figure 5, and the inner face is the same as one face of a plate 12. The faces of the head plate 16 and of the butt plate 14 are identical but diametrically opposite about a central vertical axis. A hole 114 in butt plate 14 is placed so as to correspond to hole 60 in frame 10 and to hole 90 in plate 12 and to hole 32 in head plate 16. This hole 114 extends only part way through butt plate 14 and is connected to groove 118 by channel 116 which is analogous to channel 102 in plate 12. No other holes are required in butt plate 14.

Figures 1, 5 and 7 show the various units assembled. The smallest and simplest piece of equipment would consist of a head plate 16, a frame 10 and a butt plate 14. Any number of plates and frames may be placed between the head plate and butt plate as long as plates and frames are alternated.

Between each plate and frame is placed a porous medium which will retain the reagent and any deleterious solids in the impure solution but which is permeable to the solution. For example in Figures 5 and 7, the medium 128 is a suitable grade of filter paper. Holes are punched in the paper at the four corners so as not to cover the holes in the plates and frames. If the retaining medium 128 is a weak filter paper, it is necessary to use supports 126, to prevent tearing the paper. For example, wire screens 126 may be used on both sides of the filter paper. Holes are made in the corners of the screens 126 to correspond to holes in the plates and frames. In order to make the joint solution tight, rubber as at 132 may be vulcanized around the edge of the screen and around the holes in the screen.

The operation of the apparatus may be explained by referring to Figures 1, 5 and 7. Consider the plates and frames to be clamped into position with media 128 and supports 126 in position.

The operation of introducing the reagent into the frame chambers 70 may be carried out by first turning the valves 48 and 50 so that the flow of liquid out through holes 32 and 34 is prevented. The valves 36 and 38 are both opened. Pipe 40 is connected to a pump which pumps the reagent as a slurry of particles suspended in liquid through pipe 40 and valve 36, through hole 28 and along the conduit formed by holes 64 in frames 10 and holes 86 in plates 12, as in Figure 7. From this conduit, the slurry can flow down through channels 68 in frames 10 into frame chambers 70. The solid particles of reagent will settle and be retained by the retaining medium 130 while the liquid passes through the medium 130, flows along grooves 80 and through grid openings into channel 84. Then the liquid flows along the conduit formed by holes 66 in frames 10 and holes 88 in plates 12, out through holes 30 in head plate 16, through valve 38 and out pipe 42. The slurry continues to flow in until the frame chambers 70 are completely full.

Having filled the frame chambers, the valves 36 and 38 are closed. Valve 48 is turned so that solution can flow from pipe 44 through T 46 and pipe 47 to hole 32 but so that solution cannot flow from hole 32 to T 52. Valve 50 is turned so that solution can flow from hole 34 to T 52, but not from T 46 to hole 34.

Impure solution is pumped from storage through pipe 44, through T 46, through pipe 47 into hole 32 and into the conduit formed by holes 60 in frames 10, holes 90 in plates 12 and hole 114 in end plate 14. From this conduit the solution flows through the channels 102 in plates 12 into main grooves 94, 96 and 98 and then fans out across the plate face in grooves 100, passes through the supports 126 and the retaining medium 128, through the layer of reagent 124, and then again passes out through the supports 126 and the retaining medium 128. It is picked up by the grooves 101, conducted along the grooves 97, 99 and 95, into the channel 103 and to the conduit formed by the holes 92 in plates 12 and holes 62 in frames 10. Then the purified solution flows through hole 34, through valve 50, pipe 53, through T 52 and to valve 54 which is turned so that the solution flows through pipe 58 to purified solution storage.

Any solids which may have been in suspension in the impure solution would be retained by the media 128 and would in time prevent the further flow of solution. When these solids have built up sufficiently to retard solution flow, the direction of flow is reversed. This is accomplished by turning the valve 50 so that solution from pipe 44 may enter hole 34 and by turning valve 48 so that purified solution can flow from hole 32 to valve 54. By this means, the solution flows through the layer of reagent 124 and through the media 128 opposite to the previous direction. By this means the layer of solids which may have been built up, will be washed away with solution and will be carried out to valve 54 which is turned so that this cloudy solution flows through pipe 56 to the impure storage tank. These solids are washed away in a short time and when the solution has cleared, valve 54 is turned so that the purified solution flows out pipe 58.

What I claim as my invention is:

1. In a liquid treating apparatus, an assembly of alternate frames and plates having filters therebetween and having at least four continuous bores spaced about the peripheral portions of each frame and plate, the first and second bores being substantially diametrically opposite from each other and the third and fourth bores being substantially diametrically opposite from each other, said frames having grooves on a portion of the inner surface thereof, filter screens covering said grooves, each frame having a passageway providing communication between said first bore and the space within the frame, each frame also having a passageway from the grooves to the second bore, said plates having at least one groove on each face thereof, the groove on one face communicating through a passageway with the third bore and the groove on the opposite face communicating through a passageway with the fourth bore, there being plate portions preventing communication of said first and second bores with the grooves in the plates, and there being frame portions preventing communication of said third and fourth bores with the space within the frames.

2. In a liquid treating apparatus, the combination set forth in claim 1, said plates and frames being rectangular, said bores being located in the corner portions of the frames and plates.

3. In a liquid treating apparatus, an assembly of alternate frames and plates having filters therebetween and having at least four continuous bores spaced about the peripheral portions of each frame and plate, the first and second bores being substantially diametrically opposite from each other and the third and fourth bores being substantially diametrically opposite from each other, said frames having grooves on a portion of the inner surface thereof, filter screens covering said grooves, each frame having a passageway providing communication between said first bore and the space within the frame for admission of a slurry of solid reagents into the space within the frame, each frame also having a passageway from the grooves to the second bore for egress of the liquid of said slurry, said filter screens retaining the solids of the slurry in the space within the frame, said plates having at least one groove on each face thereof, the groove on one face communicating through a passageway with the third bore and the groove on the opposite face communicating through a passageway with the fourth bore, there being plate portions preventing communication of said first and second bores with the grooves in the plates, and there being frame portions preventing communication of said third and fourth bores with the space within the frames, the end members of said assembly comprising plates having grooves only on their inner surfaces, one of said end plates having means for feeding slurry to said first bore and removing liquid from said second bore, as well as feeding and draining connections to said third and fourth bores for a liquid to be treated, whereby the liquid to be treated passes into one of said third and fourth conduits into the plate grooves connected to that conduit and then successively through the adjacent filter, the solid reagents within the frames, another filter, the groove in the adjacent plate facing the solid reagents, and out of the assembly through the other of said third and fourth bores.

LUTHER GLENN HENDRICKSON.

REFERENCES CITED

The following references are of record in the file of this patent:

UNITED STATES PATENTS

| Number | Name | Date |
|---|---|---|
| 240,406 | Gordon | Apr. 19, 1881 |
| 301,795 | Boomer | July 8, 1884 |
| 541,659 | Crooke | June 25, 1895 |
| 650,741 | Zahn | May 29, 1900 |
| 664,906 | Steffen | Jan. 1, 1901 |
| 846,582 | Lieberich | Mar. 12, 1907 |
| 1,141,491 | Schaefer | June 1, 1915 |
| 1,200,763 | Schaefer | Oct. 10, 1916 |
| 1,226,611 | Vandercook | May 15, 1917 |
| 1,302,814 | Kuryla | May 6, 1919 |
| 1,488,862 | Burchenal | Apr. 1, 1924 |
| 2,245,217 | Moulds | June 10, 1941 |